United States Patent [19]

Toida et al.

[11] Patent Number: 4,960,218

[45] Date of Patent: Oct. 2, 1990

[54] PLUG BODY FOR A LIQUID CONTAINER

[75] Inventors: Shouji Toida; Kazunori Iwasaki; Toru Goto; Shigeru Tsuchiya, all of Tokyo, Japan

[73] Assignee: Nippon Sanso Kabushiki Kaisha, Tokyo, Japan

[21] Appl. No.: 426,220

[22] Filed: Oct. 25, 1989

[51] Int. Cl.⁵ .................................. B65D 51/00
[52] U.S. Cl. ..................................... 215/311; 215/315
[58] Field of Search ............... 215/211, 260, 301, 311, 215/315, 294, 305, 3, 4, 5, 11.4, 25, 220, 267, 293, 307, 313, 320, 355, 364; 222/402.14, 518, 559; 251/230

[56] References Cited

U.S. PATENT DOCUMENTS

| | | | |
|---|---|---|---|
| 2,065,446 | 12/1936 | Gargano et al. | 222/559 |
| 3,220,695 | 11/1965 | Downey et al. | 251/230 |
| 3,561,632 | 2/1971 | Shirae | 215/315 |
| 3,863,798 | 2/1975 | Kurihara et al. | 215/301 |
| 4,262,879 | 4/1981 | Gönner | 251/230 |

FOREIGN PATENT DOCUMENTS

362958 12/1931 United Kingdom ................ 215/315

Primary Examiner—Stephen Marcus
Assistant Examiner—Vanessa Roberts
Attorney, Agent, or Firm—Cushman, Darby & Cushman

[57] ABSTRACT

A plug body having an inner cylindrical member with short engagement receivers and long engagement receivers together with steps, an operating button with short engaging elements and long engaging elements that are respectively received by the short engagement receivers and long engagement receivers, a rotatable slider provided with protrusions, a valve body with a valve stem which is inserted into the rotatable slider and the inner cylindrical member, a spring that preloads the rotatable slider upwards so that the long and short engaging elements of the operating button alternatively make contact with the protrusions, causing the rotatable slider to rotate with a depression of the operating button. The liquid passage is opened when the long engaging elements of the operating button make contact with the protrusions of the rotatable slider. In this case, the operating button protrudes upward above the upper lid of the liquid container. In contrast, the liquid passage is closed when the short engaging elements of the operating button make contact with the protrusions of the rotatable slider, and in this case, the operating button is hidden below the upper lid. Thus, the valve open state is more easily checked visually.

4 Claims, 9 Drawing Sheets

PLUG BODY FOR A LIQUID CONTAINER

BACKGROUND OF THE INVENTION

1. Field of the Invention

The present invention relate to a plug body for liquid containers such as vacuum flasks, which are capable of opening and tightly closing a liquid passage provided in the plug body itself by means of a valve control system structured in the plug body.

2. Prior Art

Plug bodies of this type are conventionally constructed so that, when an operating button is at an upper stop position, the top surface of the button is on the same level with the plug body and the liquid passage is closed, while, when the operating button is at a bottom stop position, the top surface of the operating button is lower than the top surface of the body and the liquid passage is open (Refer to Utility Model Publication (examined) No. 60-31622/1985).

However, with the above stated conventional plug bodies, when the contained liquid has been poured out, it is not easy to check the position of the operating button, since the top surface of the operating button is lower than the top surface of the plug body. This problem of a possibility of poor visual confirmation may cause a cup-formed lid provided outside of the plug body to be screwed on without the operating button having been brought back to the closed position, resulting in leakage of the liquid contents during transport of the container. This may cause burn when hot water is contained, and is very dangerous.

SUMMARY OF THE INVENTION

It is therefore an object of the present invention to provide a plug body for a liquid container enabling an improvement in the visual confirmation of the operating button position.

It is another object of the present invention to provide a plug body for a liquid container providing superior operability for such liquid containers as vacuum flasks.

In one aspect of the present invention, there is provided a plug body for a liquid container comprising:
an operating button provided with long engaging elements and short engaging elements at its lower end, the operating button being movable freely in the vertical direction;
a rotatable slider having protrusions on its circumference, the protrusions alternatively making contact with the long engaging elements and short engaging elements;
an inner cylindrical member provided on an inner surface with vertical guide tracks that guide the long engaging elements and short engaging elements and having guide surfaces that guide the protrusions to the guide tracks with the rotatable slider rotating;
spring means for preloading the rotatable slider upwards so that the protrusions make contact with one of the long engaging elements, short engaging elements, and the guide surfaces; and
valve means connected to the rotatable slider, the valve means opening a liquid passage of the liquid container when the long engaging elements make contact with the protrusions, and closing the liquid passage when the short engaging elements make contact with the protrusions,
wherein the operating button protrudes above an upper lid of the plug body when the control valve means opens the liquid passage.

Accordingly with the plug body for a liquid container of the present invention, the liquid passage opens when the long engaging elements of the operating button make contact with the protrusions of the rotatable slider. In this case, the operating button protrudes upward above the upper lid of the liquid container. In contrast, the liquid passage closes when the short engaging elements of the operating button make contact with the protrusions of the rotatable slider. In this case, the operating button is hidden below the upper lid. Thus, the valve open state is more easily checked visually.

DESCRIPTION OF THE PREFERRED EMBODIMENT

The invention will now be described with reference to FIG. 1 to FIG. 24.

A liquid container 1 has a double layer structure made of inner container 2 and an outer container 3 of stainless steel, and has a vacuum therebetween, forming a vacuum thermal insulation structure. A shoulder member 4 is connected via a water sealing packing 3A, and is positioned above and external to the outer container 3. A long narrow vertical opening 5 is provided at the upper center of the inner container 2. This opening 5 constitutes the inlet for replenishing liquid. A female thread 6 and internally protruding bottom plug seat 7 are formed in the opening.

The plug body 8 of this embodiment is installed in the opening 5 of the inner container 2. The plug body 8 is made mainly of a cylinder shaped plug proper 9 attachable/detachable to the opening 5 by screwing into the female thread 6, a liquid passage 10 provided vertically through the plug proper 9, a valve body 11 that opens/closes the above mentioned liquid passage 10, and a valve operating mechanism A for opening/closing the valve body 11 which will be described in the following. On the outer diameter of the outer container 3 of the liquid container 1 is provided a handle 12.

The plug proper 9 of the plug body 8 has the following elements: an external cylindrical member 17 having a large diameter rim 13 on the top, a male thread 14 at an outer middle portion, which fits with the above mentioned female thread 6 of the opening 5, a valve seat 15 on a bottom portion, and four equidistant vertical ribs 16 formed on the internal surface; an inner cylindrical member 20 inside the external cylindrical member 17 having a large diameter flange 18 at the top, and a pair of ribs 19 grooved to fit with the above mentioned vertical ribs 16; and an upper lid 24 covering a cylindrical guide member 22 and the inner cylindrical member 20, and having a mounting hole in the center for mounting the operating button 23. The cylindrical guide member 22 above is positioned below the inner cylindrical member 20, and guides the valve stem 21 of the valve body 11. The inner cylindrical member 20 is positioned and fixed in the external cylindrical member 17 by fitting the vertical ribs 16 of the external cylindrical member 17 between the grooved ribs 19 of the inner cylindrical member 20. Between the internal surface of the external cylindrical member 17 and the external surface of the inner cylindrical member 20, the liquid passage 10, complete with the respective liquid outlet 25 and inlet 26, is provided with the internal and external surfaces maintained at a prescribed distance apart. On the large diameter rim 13 and the bottom circumferential surface of the external cylindrical member 17, are provided packings 27 and 28 that seat respectively on the upper end of the shoulder member 4 and the plug seat 7 of the opening 5.

The valve body 11 for opening/closing the liquid passage 10 is provided with an integrally formed valve stem 21 protruding upward from the center of a valve plate 29. On the outer circumference of the valve plate 29, is installed a packing 30 that fits tightly with the valve seat 15. The valve stem 21 passes through the cylindrical guide member 22 from the bottom into the inner cylindrical member 20 and is freely movable in the vertical direction. When the operating button 23 is depressed, the valve body 11 either closes the liquid inlet 26 of the liquid passage 10 by pressing the packing 30 on the circumference of the valve plate 29 against the valve seat 15 of the external cylindrical member 17, or moves the packing 30 on the valve seat 15 down a little to open the liquid inlet 26. At the upper end of the valve stem 21 a rotatable slider 31 is positioned and fixed with a screw 32. A spring 34 is installed around the valve stem 21, between the packing plate 33 positioned on the upper surface of the cylindrical guide member 22 and the rotatable slider 31. The rotatable slider 31 is preloaded upward with this spring 34.

The operating button 23 is provided with a circumferential wall 36 under its top 35. Close to its upper end, the circumferential wall 36 is incorporated with an external flange 37 that comes into contact with the upper lid 24. At its lower end the circumferential wall 36 is provided with four each of long engaging element 38 and short engaging element 39 alternately positioned at a prescribed distance and protruding downward (see FIG. 8). Tips 38A of the long engaging elements 38 are pointed in a triangular form, and are positioned lower than similarly pointed tips 39A of the short engaging elements 39. The short engaging elements 39 extend more outward and are thicker than the long engaging elements 38. One of the inclined surfaces of the tip 38A of the long engaging element 38 (the right surface in FIG. 8), and one of the inclined surfaces of the tip 39A of the short engaging element 39 (the right surface in FIG. 8) constitute inclined surfaces 36A and 36B respectively. The long engaging elements 38 and short engaging elements 39 are interconnected at the upper ends.

On the inner surface of the inner cylindrical member 20, are provided alternately four sets of guiding tracks (slots) 40 and 41 at equal distance circumferentially. The guiding tracks 40 are for preventing the long engaging elements 38 from turning and for guiding them vertically, and the guiding tracks 41 are for preventing the short engaging elements 39 from turning and for guiding them vertically. The depth of the guiding tracks 40 and 41 is such as to match the width of the long engaging elements 38 and short engaging elements 39, respectively. Between the guiding tracks 40 and 41, the long engagement receivers 42 and short engagement receivers 43 are arranged alternately at an equal distance circumferentially. Accordingly, on the inner surface of the inner cylindrical member 20, are arranged in order four sets, each of which consists of long engagement receivers 42, guiding tracks 40, short engagement receivers 43 and guiding tracks 41. At the lower end of each long engagement receiver 42, a surface 42A inclining in the opposite direction to that of the inclined surface 36A (higher to the left as shown of FIG. 9) is formed. The inclined surfaces 42A are connected, through the guiding tracks 40, to a little above the tips of the short engagement receivers 43. The steps 44 are incorporated at the connection points. At the lower end of each short engagement receiver 43, is formed the surface 43A inclining in the opposite direction to that of the inclined surface 36B (higher to the left as shown on FIG. 9). The inclined surfaces 43A are connected to the guiding tracks 41.

Figure 10:
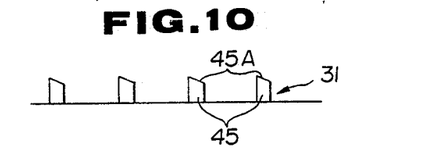
FIG. 10 is a development showing protrusions of the rotatable slider.

The rotatable slider 31 is for activating the valve body 11, as the rotatable slider 31 moves vertically and rotates in the inner cylindrical member 20. The outer circumference of this rotatable slider 31 is provided with four protrusions 45 at equal distance to each other (see FIG. 3). The circumferential width of the protrusions 45 is a little narrower than the width of the guiding tracks 40 and 41, allowing the protrusions 45 to slide freely in the tracks 40 and 41. The top ends of the protrusions 45 are provided with inclined surfaces 45A which are inclined in the same direction (higher to the left as shown in FIG. 10) as the inclined surfaces 42A and 43A so that they engage. The valve operating mechanism A comprises the following elements: the operating button 23 incorporating the long engaging elements 38 and short engaging elements 39; the rotatable slider 31 having protrusion 45 and preloaded upwards by the spring 34; the guiding tracks 40 and 41 provided on the inner cylindrical member 20; and the long engagement receivers 42 and short engagement receivers 43.

An outer lid/cup 46 that covers the plug body 8 can be installed and removed freely by screwing a female screw 47 provided on its bottom inner circumference onto a male thread 48 provided on the outer circumference of the container shoulder member 4. In the outer lid 46 is contained a cup 49, an inner central position of which has a protrusion 50 formed that is able to depress the operating button 23 in the protruding state when the outer lid 46 is applied.

An explanation of the movement of the plug body 8 for a liquid container constructed as above will be given with reference to the drawings shown in FIG. 11 to FIG. 22.

Figure 2:
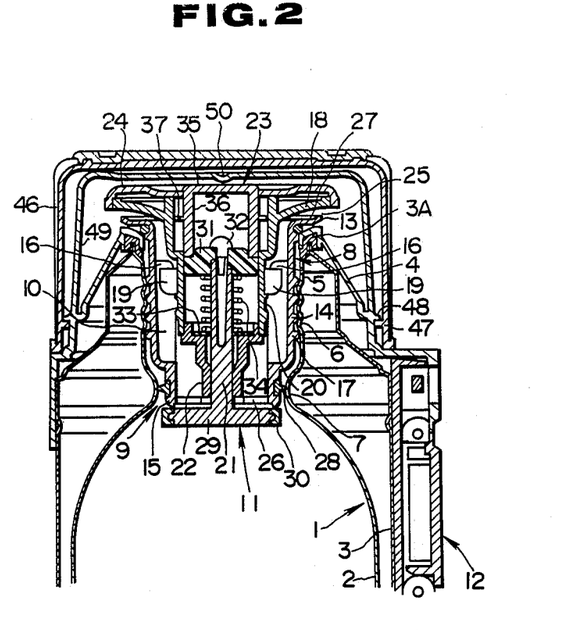
FIG. 2 is a section view showing the upper portion of the liquid container with the lid and the valve closed.
Figure 3:
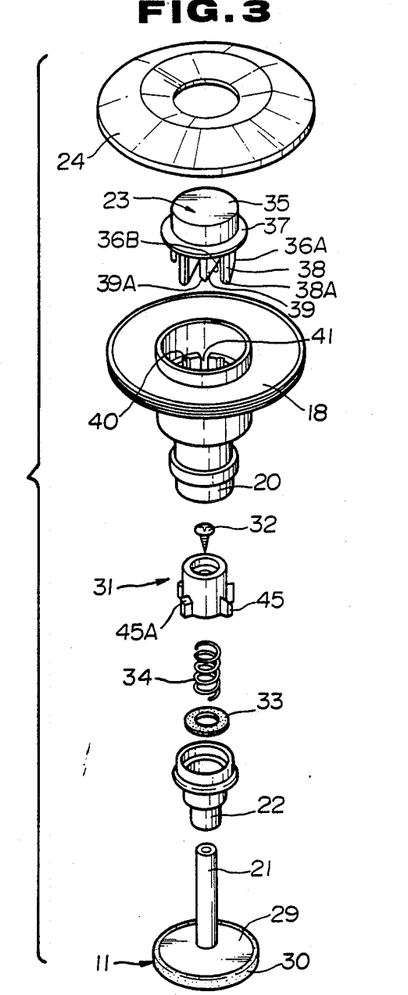
FIG. 3 is an explosive perspective view of a plug body with an upper lid of the embodiment.
Figure 4:
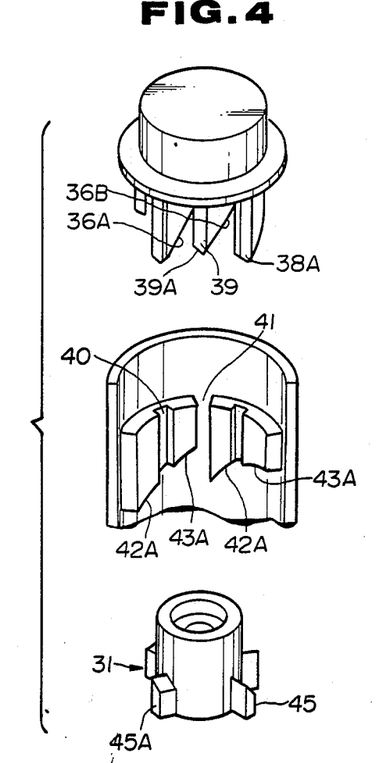
FIG. 4 is a section view showing an operating mechanism of the plug body of the embodiment.
Figure 5:
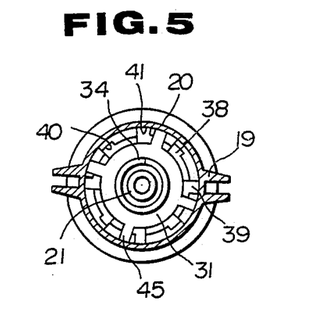
FIG. 5 is a transverse cross section of the plug body.
Figures 6, 7:
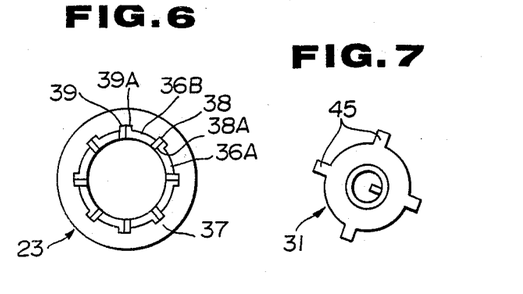
FIG. 6 is a bottom view of an operating button.
FIG. 7 is a bottom view of a rotatable slider of the embodiment.
Figure 8:
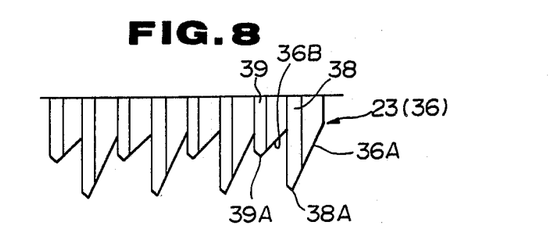
FIG. 8 is a development showing long and short engaging elements of the operating button.
Figure 9:
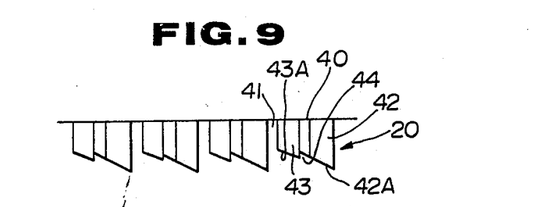
FIG. 9 is a development showing long and short engagement receivers of the inner cylindrical member.
Figure 11:
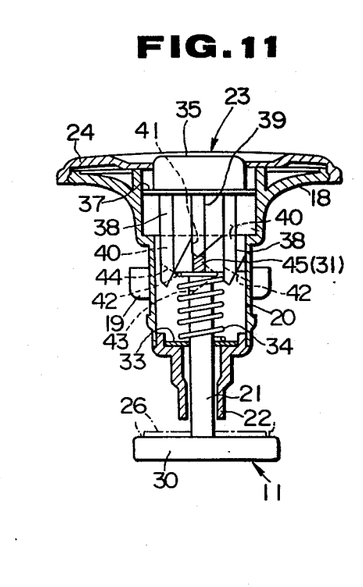
FIG. 11 and FIG. 17 are sectional views showing the valve closed state.
Figure 12:
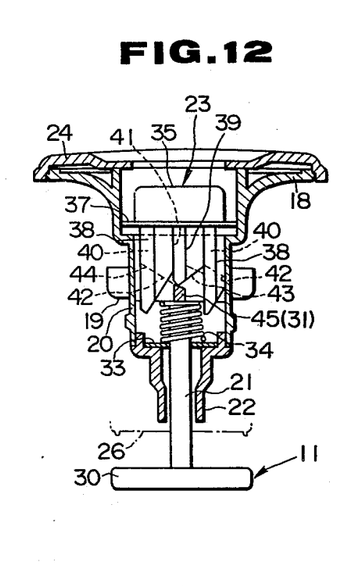
FIG. 12 and FIG. 18 are sectional views showing the operating button in a depressed state.
Figure 16:
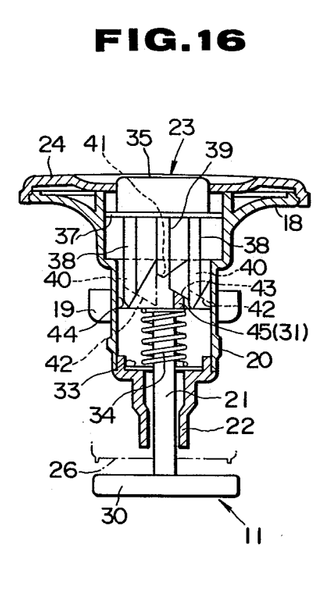
FIG. 16 and FIG. 22 are sectional views showing the valve in a state of moving from the open state to the closed state.
Figure 17:
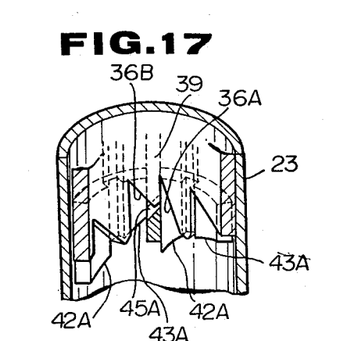
Figure 18:
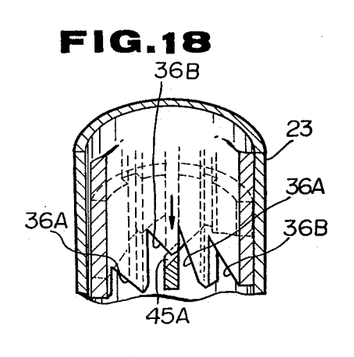

These drawings show cross sectioned front views of the plug body 8. The long engagement receivers 42, the short engagement receivers 43, and the guiding tracks 40 and 41 that are hidden are drawn with dotted lines in FIG. 11 to FIG. 16. When the valve is closed, as seen in FIG. 11, FIG. 17 and FIG. 2, the protrusions 45 are engaged in the guiding tracks 41 making contact with the short engaging elements 39. The rotatable slider 31 is preloaded upward by compression force of the spring 34, depressing the packing 30 on the outer circumference of the valve plate 29 against the valve seat 15 by way of the valve stem 21 to keep the valve closed. The short engaging elements 39 are inserted in the guiding tracks 41 and the long engaging elements 38 are inserted in the guiding tracks 40 respectively, and the top 35 of the operating button 23 is approximately aligned with the top of the upper lid 24.

Figure 1:
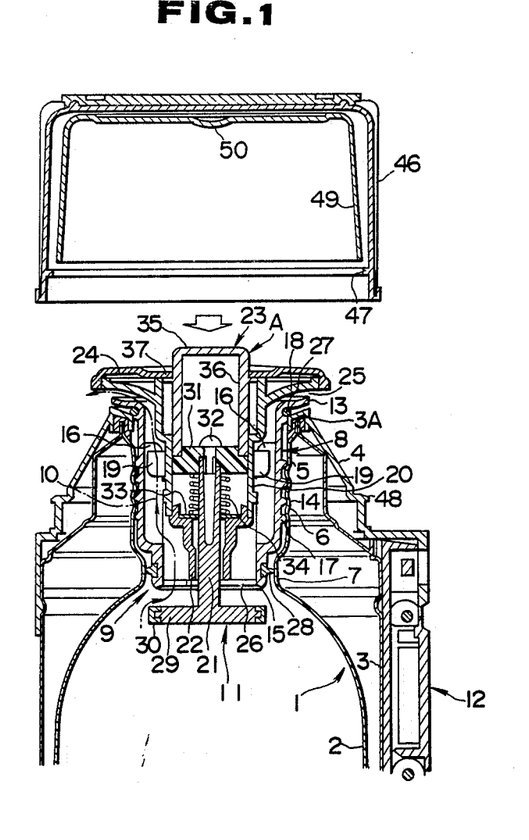
FIG. 1 is a section view showing an upper portion of a liquid container of an embodiment of the present invention with a lid and a valve open.
Figure 15:
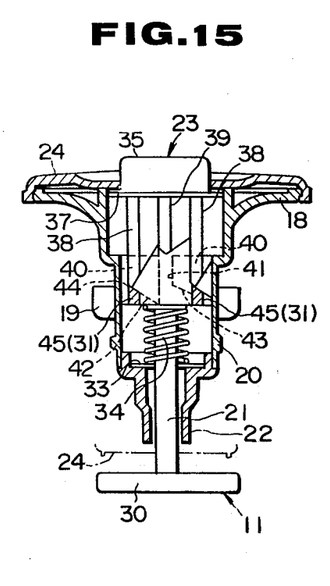
FIG. 15 and FIG. 21 are sectional views showing the valve open state.
Figure 21:
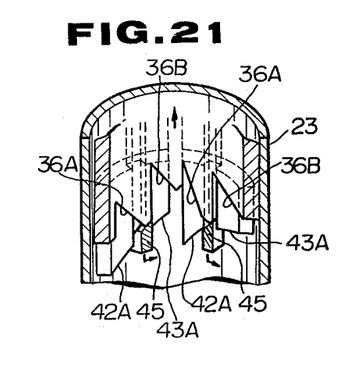

Referring to FIGS. 12 to 14, and FIGS. 18 to 20, the procedure from the valve closed state to the valve open state as shown with FIG. 15, FIG. 21 and FIG. 1, is described as follows:

First of all, when an operator depresses the operating button 23 downward by his or her finger, the long engaging elements 38 and short engaging elements 39 move down along the respective guiding tracks 40 and 41, pushing down the protrusions 45 of the rotatable slider 31 down along the guiding tracks 41 to the bottom end of the long engagement receivers 42 of the inner cylindrical member 20. As the rotatable slider 31 moves down, the valve body 11 also moves down.

Figure 13:
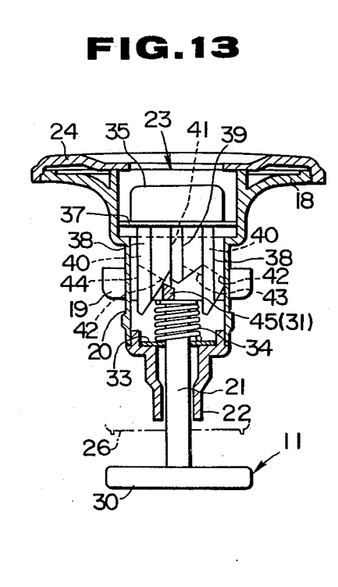
FIG. 13 and FIG. 19 are sectional views showing the protrusions of the rotatable slider riding on the long engagement receivers.
Figure 14:
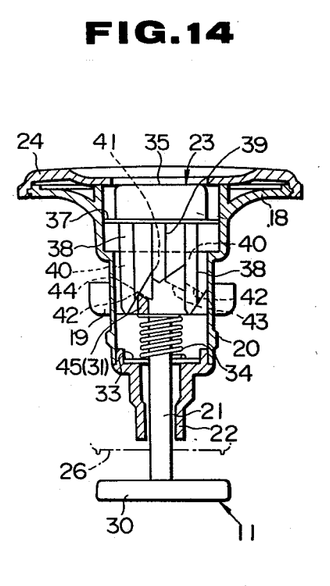
FIG. 14 and FIG. 20 are sectional views showing the protrusions of the rotatable slider in a state of rotating and moving upward.
Figure 19:
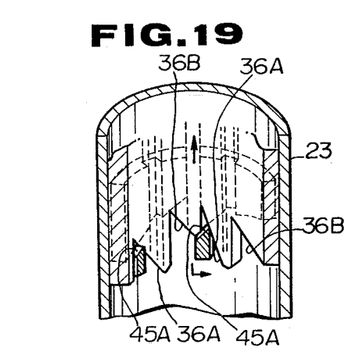
Figure 20:
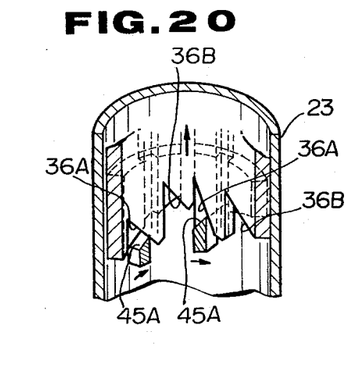

Due to the sliding force between the tips 39A of the short engaging elements 39 and the inclined surfaces 45A, the protrusions 45 turn a little and move to the bottom ends of the inclined surfaces 42A of the long engagement receivers 42, as seen in FIGS. 13 and 19 which indicate the state with the operating button 23 having returned a little upward. At the same time, the protrusions 45 come into contact with the inclined surfaces 36A that connect with the tips 38A of the long engaging elements 38.

If the operator's finger is removed from the operating button 23, the protrusions 45 of the rotatable slider 31 go up while rotating, and push up the circumferential wall 36 of the operating button 23, keeping contact with the surfaces from the inclined surfaces 36A to the inclined surfaces of the tips 38A of the long engaging elements 38, thus bringing the operating button 23 to the upper position. Along with the motion of the rotatable slider 31, the valve body 11 also moves up while rotating. As the protrusions 45 reach steps 44, the protrusions 45 are held and fixed by the steps 44. As a result, the valve body 11 is positioned below the valve seat 15 so that the liquid outlet 25 of the liquid passage 10 is open, and the valve is in the open state. In this case, as the protrusions 45 push up the long engaging elements 38 through contact with the tips 38A of the long engaging elements 38, the top 35 of the operating button 23 protrudes from the upper lid 24 with the flange 37 held by the upper lid 24. If the liquid container 1 is tilted in this state, the liquid contents can flow out through the liquid passage 10 and the outlet 25, into the cup 49 or the outer/cup lid 46 preliminarily set in place.

Figure 22:
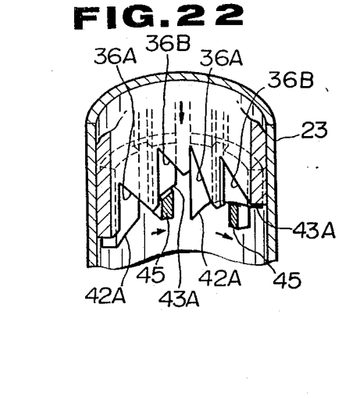

To close the plug body 8, the operating button 23 protruding from the upper face of the upper lid 24 is pushed down. By so doing, the long engaging elements 38 move down, as shown in FIGS. 16 and 22, and accordingly the protrusions 45 move below the steps 44 along the guiding tracks 40. By contact of the inclined surfaces of the tips 38A of the long engaging elements 38 with the inclined surfaces 45A of the protrusions 45, the protrusions 45 moves to the inclined surface 43A of the engagement receivers 43 while the protrusions 45 are turning. Due to the preload of the spring 34, the protrusions 45 move up along the inclined surfaces 43A, and finally rise rapidly guided by the guiding tracks 41, so as to eventually bring the plug body 8 back to the closed state as show in FIGS. 11 and 17.

When the outer lid 46 is screwed in together with the cup 49 onto the shoulder member 4, then with the valve open, as shown in FIGS. 15 and 21, even if the operating button 23 is left undepressed, the protrusion 50 inside of the cup 49 depresses the control bottom 23, so that the valve is automatically closed as shown in FIG. 2. Therefore, the liquid contents will never flow out even if container 1 is tilted.

The difference in the function of this embodiment compared to that of conventional plug bodies is described as follows referring to FIG. 23 and FIG. 24.

Figure 23A:
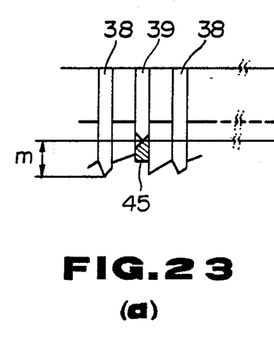
FIG. 23 is a view illustrating the valve closed state (a), the operating button depressed state (b), and the valve open state (c) of the embodiment.
Figures 23B, 23C:
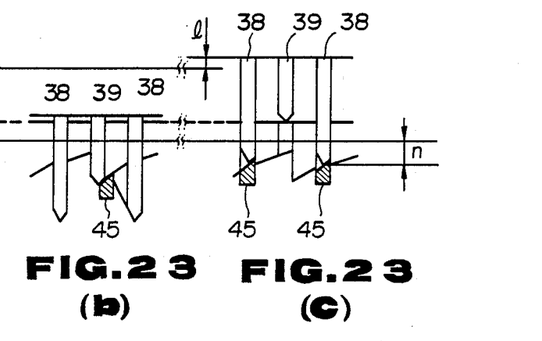
Figure 24A:
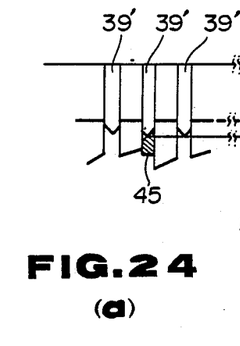
FIG. 24 is a view illustrating the valve closed state (a), the operating button depressed state (b), and the valve open state (c) of a conventional plug.
Figures 24B, 24C:
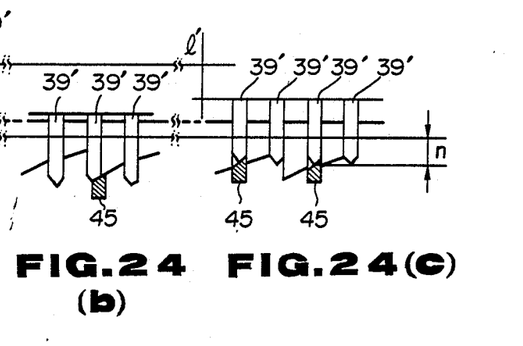

FIG. 23 shows the operational steps of this embodiment, while FIG. 24 shows the same steps for a conventional plug body. The first step (a) in FIGS. 23 and 24 indicates the valve close state, step (b) in FIGS. 23 and 24 shows the operating button depressed state, and step (c) in FIGS. 23 and 24 illustrates the valve open state. In these drawings, the following conditions are assumed: the engaging elements 39' of the conventional plug body are of the same length as the short engaging elements 39 of this embodiment; the length of the long engaging elements 38 of this embodiment is longer by m than that of the short engaging elements 39 and engaging elements 39'; all other configurations and lengths are kept the same; the stop position of the protrusions 45 is at the same height in (a) of FIG. 23 and (a) of FIG. 24, or in (c) of FIG. 23 and (c) of FIG. 24; the height difference of the protrusions 45 between (a) and (c) of FIG. 23 or FIG. 24 is n; and the top of the plug bodies and control buttons are at approximately the same height with the valve closed.

In FIG. 24, since the top position of the operating button of the conventional plug body in the valve open state is lower by n than that in the valve close state, that is, since the difference of the open/close positions of the protrusions 45 is n, the top of the operating button 23 in the valve open state is l'=n lower than in the valve close state. Therefore, the top of the operating button is positioned lower than the plug body head portion.

On the other hand, with this embodiment, since the long engaging elements 38 are longer than the short engaging elements 39 by m as shown in FIG. 23, the top 35 of the operating button 23 in the valve open state is positioned $l=m-n$ higher than for the valve close state. Therefore, it protrudes above the upper lid 24.

Thus, as described above, the valve open state is more easily checked visually and the closing of the valve body 11 can be positively carried out.

In addition, as open/close of the valve can be effected with one operating button 23 only, it is not necessary to provide two operating buttons, one for opening, and the other for closing, allowing the size of the above mentioned push button 23 to be enlarged, thereby avoiding misoperation, and providing a plug body of superior operability. Even if the closing of the valve is neglected, the valve will be automatically closed as the cup 49 is screwed onto the container shoulder member 4, thus offering higher security.

Although a specific embodiment of a plug body for a liquid container constructed in accordance with the present invention has been disclosed, it is not intended that the invention be restricted to either the specific configurations or the uses disclosed herein. Modifications may be made in a manner obvious to those skilled in the art. For example:

In the above embodiment, the closing of the valve is performed automatically by contact of the protrusion 50 of the cup 49. However, if the cup is flat at the inner center, or in the absence of a cup, the valve closing function can be carried out directly by contact of the outer lid 46. Various other modifications are also possible such as lowering the top of the operating button below the top of the plug body (upper lid).

Accordingly, it is intended that the invention be limited only by the scope of the appended claims.

What is claimed is:

1. A plug body for a liquid container comprising:
   an operating button provided with long engaging elements and short engaging elements at its lower end, said operating button being movable freely in the vertical direction;
   a rotatable slider having protrusions on its circumference, said protrusions alternatively making contact with said long engaging elements and short engaging elements;
   an inner cylindrical member provided on an inner surface with vertical guide tracks that guide said long engaging elements and short engaging elements, and having guide surfaces that guide said protrusions to said guide tracks with said rotatable slider rotating;
   spring means for preloading said rotatable slider upwards so that said protrusions make contact with one of said long engaging elements, short engaging elements, and said guide surfaces; and
   valve means connected to said rotatable slider, said valve means opening a liquid passage of the liquid container when said long engaging elements make contact with said protrusions, and closing the liquid passage when said short engaging elements make contact with said protrusions,
   wherein said operating button protrudes above an upper lid of the plug body when said control valve means opens said liquid passage.

2. A plug body for a liquid container according to claim 1 further comprising pressing means for pressing said operating button when said operating button protrudes above the upper lid, thereby closing said liquid passage by means of said valve means.

3. A plug body for a liquid container according to claim 2 wherein said pressing means is a projection provided at the center of an inner surface of a cup or an outer lid of said liquid container.

4. A plug body for a liquid container according to claim 1 wherein said protrusions and said guide surfaces have inclined surfaces of opposite inclination so that the inclined surfaces of said protrusions and the inclined surfaces of said guide surfaces can be slidably engaged.

* * * * *